US010263422B2

(12) United States Patent
Liu (10) Patent No.: US 10,263,422 B2
(45) Date of Patent: Apr. 16, 2019

(54) SHUTDOWN CONTROLLING METHOD FOR POWER SYSTEM (71) Applicant: CYBER POWER SYSTEMS INC., Taipei (TW)

(72) Inventor: Hsien-Hsun Liu, Taipei (TW)

( * ) Notice: Subject to any disclaimer, the term of this patent is extended or adjusted under 35 U.S.C. 154(b) by 647 days.

(21) Appl. No.: 14/702,102

(22) Filed: May 1, 2015

(65) Prior Publication Data

US 2015/0263518 A1  Sep. 17, 2015

Related U.S. Application Data (63) Continuation-in-part of application No. 13/403,435, filed on Feb. 23, 2012, now abandoned.

(51) Int. Cl.
*H02J 3/00* (2006.01)
*G05B 15/02* (2006.01)
*G06F 1/26* (2006.01)

(52) U.S. Cl.
CPC ............... *H02J 3/00* (2013.01); *G05B 15/02* (2013.01); *G06F 1/266* (2013.01)

(58) Field of Classification Search
CPC ................................. G06F 1/266; G06F 11/30
USPC ......................................................... 700/297
See application file for complete search history.

(56) References Cited

U.S. PATENT DOCUMENTS

| | | | | |
|---|---|---|---|---|
| 7,330,990 B2* | 2/2008 | Sato | ............... | G06F 11/2015 713/300 |
| 7,622,822 B2* | 11/2009 | Gelonese | ............... | G06F 1/266 307/38 |
| 8,305,737 B2* | 11/2012 | Ewing | ............... | G06F 1/266 361/622 |
| 8,552,584 B2* | 10/2013 | Cohen | ............... | G06F 1/30 307/29 |
| 8,674,823 B1* | 3/2014 | Contario | ............... | H02J 1/10 340/333 |
| 2004/0047095 A1* | 3/2004 | Reynolds | ............... | G06F 1/26 361/62 |
| 2004/0117330 A1* | 6/2004 | Ehlers | ............... | G06Q 10/10 705/412 |

(Continued)

OTHER PUBLICATIONS

CyberPower, "PowerPanel® Business Edition User's Manual", Aug. 8, 2010, pp. 81.*

(Continued)

*Primary Examiner* — Miranda M Huang
*Assistant Examiner* — Olvin Lopez Alvarez
(74) *Attorney, Agent, or Firm* — Shimokaji IP (57) ABSTRACT

A shutdown controlling method is applied to a system that has a host computer, a PDU and multiple electric apparatus connected to the PDU. The PDU has multiple outlets and stores preset shutdown periods for the outlets respectively. The PDU communicates with the electric apparatus and obtains their required shutdown periods. When PDU is controlled to cut off an outlet, the PDU determines whether the preset shutdown period of the outlet is larger than the required shutdown period. If yes, the PDU cuts out the AC power of the outlet. If not, the PDU cancels the shutdown command and notifies the host computer. Therefore, a manager may update the preset shutdown period of the outlet to ensure that each electric apparatus has enough time to be safely shut down.

5 Claims, 10 Drawing Sheets

(56) References Cited

U.S. PATENT DOCUMENTS

| | | | | |
|---|---|---|---|---|
| 2006/0002732 A1* | 1/2006 | Hwang | G03G 15/107 | 399/88 |
| 2006/0160622 A1* | 7/2006 | Lee | G07F 17/323 | 463/42 |
| 2007/0210650 A1* | 9/2007 | Togashi | G06F 11/1441 | 307/43 |
| 2008/0019068 A1* | 1/2008 | Reynolds | G06F 1/26 | 361/93.1 |
| 2008/0109202 A1* | 5/2008 | Stergiou | G06F 17/5027 | 703/13 |
| 2009/0125743 A1* | 5/2009 | Robertson | G06F 1/266 | 713/324 |
| 2009/0198385 A1* | 8/2009 | Oe | G06F 1/28 | 700/296 |
| 2009/0234512 A1* | 9/2009 | Ewing | H04L 12/10 | 700/295 |
| 2010/0217965 A1* | 8/2010 | Wolff | H04L 12/10 | 713/2 |
| 2011/0012433 A1* | 1/2011 | Parsons | H05B 37/0227 | 307/117 |
| 2011/0080046 A1* | 4/2011 | Lee | G06F 1/26 | 307/39 |
| 2011/0087904 A1* | 4/2011 | Lee | G06F 1/26 | 713/320 |
| 2011/0184575 A1* | 7/2011 | Kawamoto | G06Q 50/06 | 700/292 |
| 2011/0218689 A1* | 9/2011 | Chan | G01R 21/00 | 700/295 |
| 2011/0320827 A1* | 12/2011 | Siegman | G06F 1/266 | 713/300 |
| 2012/0119577 A1* | 5/2012 | Clarke | H02J 3/14 | 307/40 |
| 2012/0297217 A1* | 11/2012 | Lee | G06F 1/266 | 713/320 |
| 2012/0317428 A1* | 12/2012 | Liu | G06F 1/266 | 713/310 |
| 2013/0057910 A1* | 3/2013 | Matsumoto | G06K 15/402 | 358/1.15 |
| 2013/0096730 A1* | 4/2013 | Numata | G06K 15/40 | 700/297 |
| 2013/0218362 A1* | 8/2013 | Liu | G06F 1/266 | 700/297 |
| 2013/0332751 A1* | 12/2013 | Iwata | G06F 1/26 | 713/300 |

OTHER PUBLICATIONS

Mitsubishi Electric, "High Speed Power Line Communication Technology", Mar. 2005, pp. 5. (Year: 2005).*

* cited by examiner

SHUTDOWN CONTROLLING METHOD FOR POWER SYSTEM

CROSS-REFERENCE TO RELATED APPLICATIONS

This application is a continuation-in-part (CIP) application of the U.S. patent application Ser. No. 13/403,435, filed on Feb. 23, 2012, which is now pending, the disclosure of which is incorporated herein in its entirety by reference.

BACKGROUND OF THE INVENTION

1. Field of the Invention

The present invention relates to a shutdown controlling method for a power system, especially to a shutdown controlling method that ensures electric apparatuses connected to the PDU having enough time to complete a shutdown process.

2. Description of Related Art

To easily shut down and power on multiple computers or servers at the same time, a power strip is proposed. The power strip has an AC power input, multiple AC power outlets and a power breaker. The power breaker is connected between the AC power input and the multiple AC power outlets in series. When the power breaker is turned on, an AC power input to the AC power input is transmitted to each of the AC power outlets. On the contrary, all AC power outlets do not output the AC power when the power breaker is turned off. Therefore, electronic apparatuses respectively connected to the AC power outlets can be shut down or powered on at the same time by turning off or on the power breaker of the power strip. However, parts of the electric apparatuses connected to the power strip have to be shut down or power on respectively. Therefore, an improved power strip with multiple power breakers is developed. The power breakers are connected to the corresponding AC power outlets to independently power on or off the corresponding AC power outlets. A manager manually controls the power breakers to determine a shutdown sequence and a power-on sequence for the electric apparatuses.

However, the manager has to remember the shutdown sequence and the power-on sequence for the electric apparatuses. When the power strip connects to a lot of the electric apparatuses, using the power strips is still not convenient.

Figure 7:
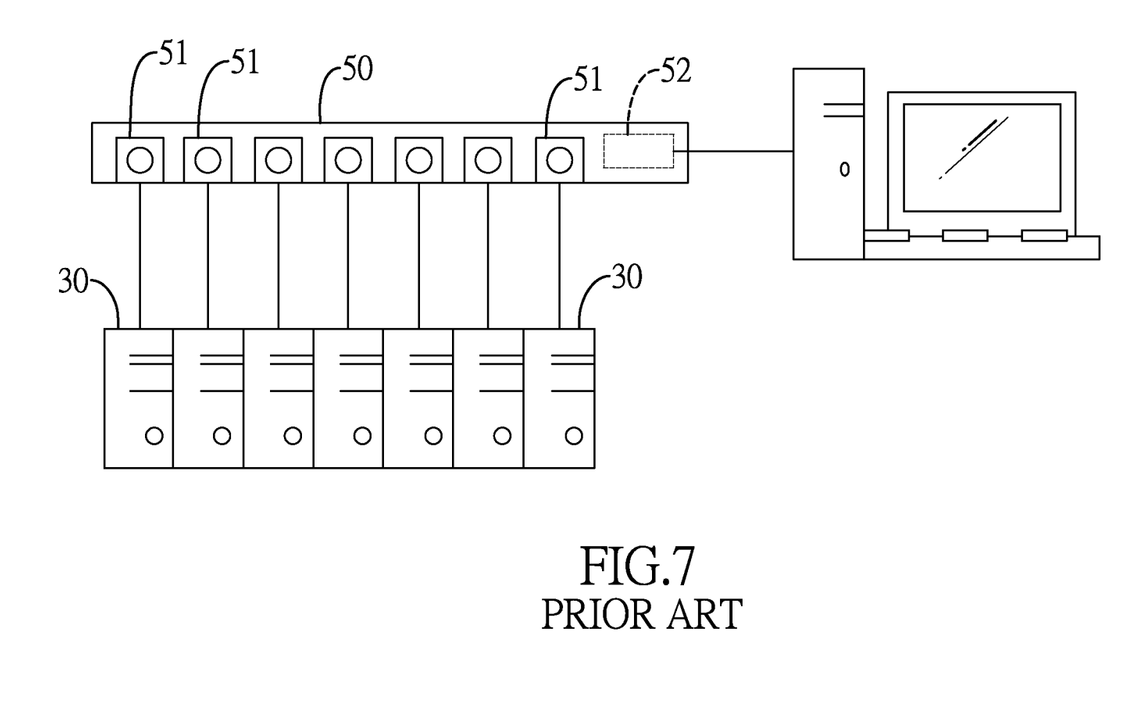
FIG. 7 is a schematic view of a conventional controlling system in accordance with the prior art.

Recently, a power distribution unit (PDU) is proposed. With reference to FIG. 7, the PDU 50 has an AC power input, multiple AC power outlets 51 and a controlling unit 52. When the AC power input is connected to an AC power source, each of the AC power outlets 51 can output an AC power. The controlling unit 52 stores parameters including a shutdown time and a power-on time for each AC power outlet 51. The manager presets the shutdown times and the power-on times of all the AC power outlets 51. At the shutdown time, the controlling unit 52 sequentially stops outputting the AC power of the AC power outlets 51 to shut down the electric apparatuses 30. Therefore, the PDU 50 can automatically turn off the electric apparatuses 30 in sequence and ensure that each electric apparatus 30 has enough time to completely shut down.

Based on the foregoing description, the manager conveniently shuts down the electric apparatuses by using the PDU. However, shutdown the electric apparatus may require different time to safely shut down, i.e. having different shutdown periods, so the manager has to change the parameters stored in the PDU. Therefore, the PDU has to require a convenient controlling system to preset parameters.

US Patent Application Pub. No. 20120119577—hereinafter "US20120119577" entitled "Smart Power Sockets, Boards, and Plugs" disclosed an approach is provided where a smart socket receives a request over a power line and generates a second request based on the received request. The second request is transmitted over a power cord connecting the smart power socket to a device. The device determines whether power is still needed at the device in order to perform one or more device operations. Thus, US20120119577 is only used for a device having the above determining function.

A non-patent document entitled "Power Panel® Business Edition User's Manual, Aug. 20, 2010" issued by Cyber-Power Inc. introduces a management software applied to UPS systems. As disclosed on page 40 of the user's manual, a function "Prevent Early Off" of the management software installed in a client computer avoids an unsafely shutdown by sending a signal to a PDU. However, the protection function is only provided to the client computer with the management software installed therein. For other client computers without the management software installed therein, these client computers do not possess the "Prevent Early Off" function even though they are connected to the same PDU. Therefore, these client computers may still encounter the problem of unsafely shutdown. Thus, the above client computer is similar to the device of US20120119577, each of the above client computers needs to install a "Prevent Early Off" software.

SUMMARY OF THE INVENTION

The main objective of the present invention is to provide a shutdown controlling method for a system to ensure to completely shut down and safely shut down an electric apparatus, especially that electric apparatuses do not need to determine whether power is still needed.

The shutdown controlling method is applied to a system that has a host computer, a PDU and multiple electric apparatus connected to the PDU. The PDU has multiple outlets and stores preset shutdown periods for the outlets respectively. The PDU communicates with the electric apparatus and obtains their required shutdown periods. When PDU is controlled to cut off an outlet, the PDU determines whether the preset shutdown period of the outlet is larger than the required shutdown period. If yes, the PDU cuts out the AC power of the outlet. If not, the PDU cancels the shutdown command and notifies the host computer. Therefore, a manager may update the preset shutdown period of the outlet to ensure that each electric apparatus has enough time to be safely shut down.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
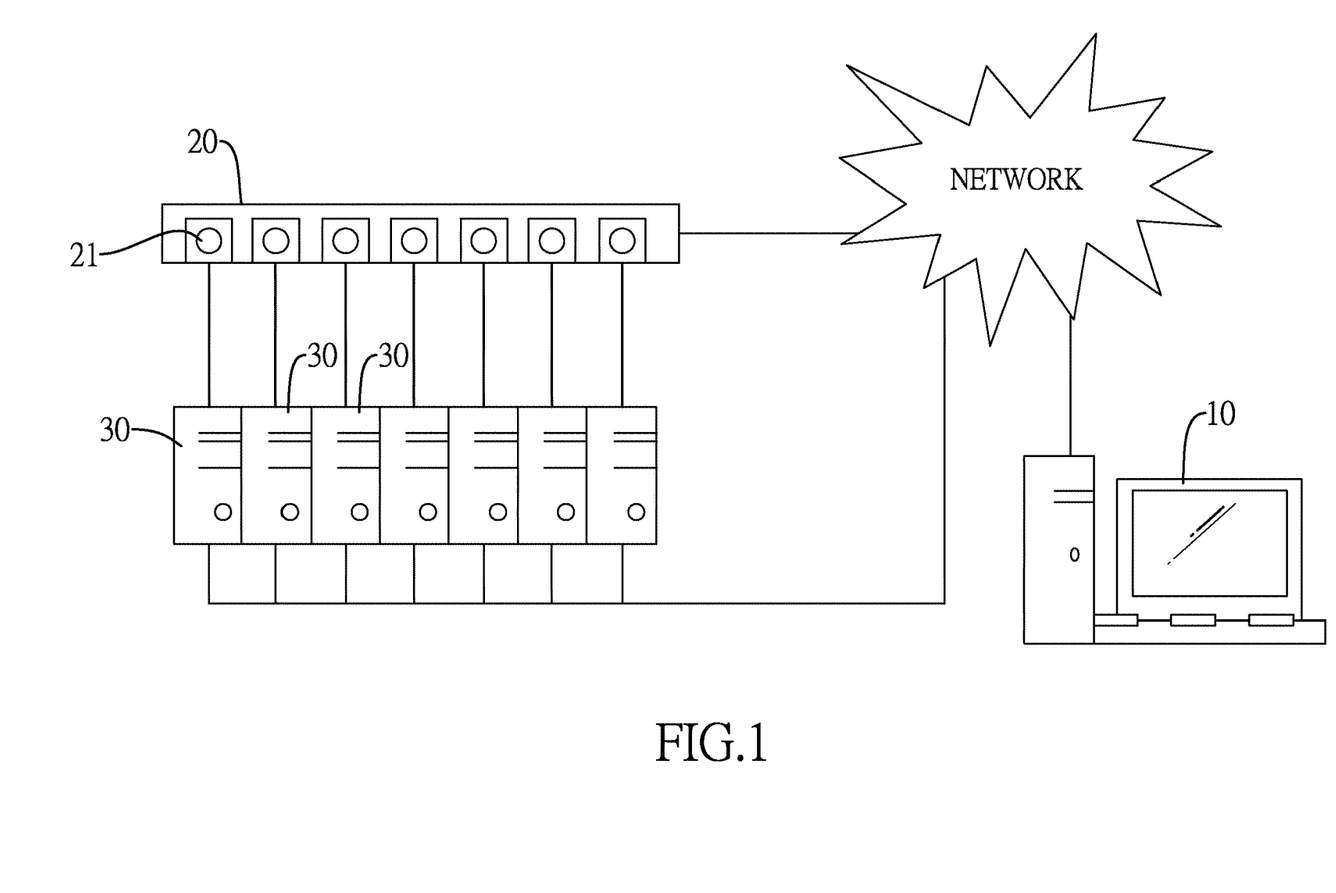
FIG. 1 is a schematic view of a power system for implementing a shutdown control method in accordance with the present invention.

With reference to FIG. 1, a power system controlled by the present invention comprises a host computer 10, a power distribution unit (PDU) 20 and multiple electric apparatuses 30. The host computer 10 connects to a network such as Internet or Intranet. The PDU 20 links to the host computer 10 through the network. The electric apparatuses 30 are connected to the PDU 20 to receive AC power and connect to the computer 10.

Figure 2:
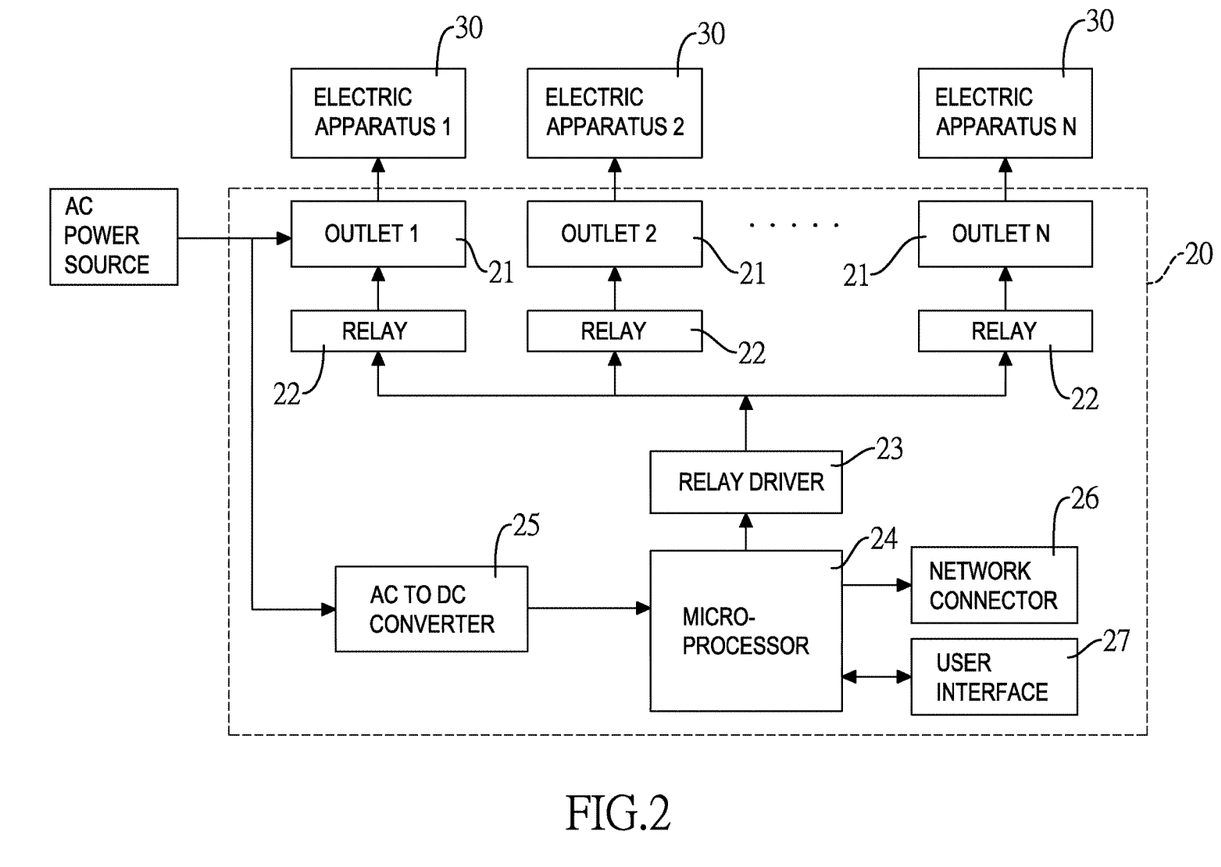
FIG. 2 is functional block view of a PDU of the power system in accordance with the present invention.

With further reference to FIG. 2, the PDU 20 has multiple outlets 21, relays 22, a relay driver 23, a microprocessor 24, an AC to DC converter 25 and a network connector 26. The PDU 20 may further comprise a user interface (UI) 27 connected to the microprocessor 24 for receiving operations commands input by a manager.

The outlets 21 are connected to an external AC power source and each outlet 21 is connected to a corresponding relay 22. The microprocessor 24 drives the relays 22 through the relay driver 23. The AC to DC power converter 25 is connected to the AC power source and the microprocessor 24, and converts an AC power from the AC power source to a DC power. The DC power is supplied to the microprocessor 24. The network connector 26 is connected to the microprocessor 24 so the microprocessor 24 links to the host computer 10 through the network connector 26 and the network. The microprocessor 24 stores multiple preset shutdown periods (Ts) for the outlets 21 respectively, and a shutdown controlling procedure.

The electric apparatuses 30, such as client computers or servers, are respectively connected to the outlets 21 to be powered by the AC power, and link to the computer 10. Therefore, the PDU 20 and each electric apparatus 30 can communicate to each other through the network. In this embodiment, each outlet 21 of the PDU 20 is for connecting to an electric apparatus 30.

Figure 3:
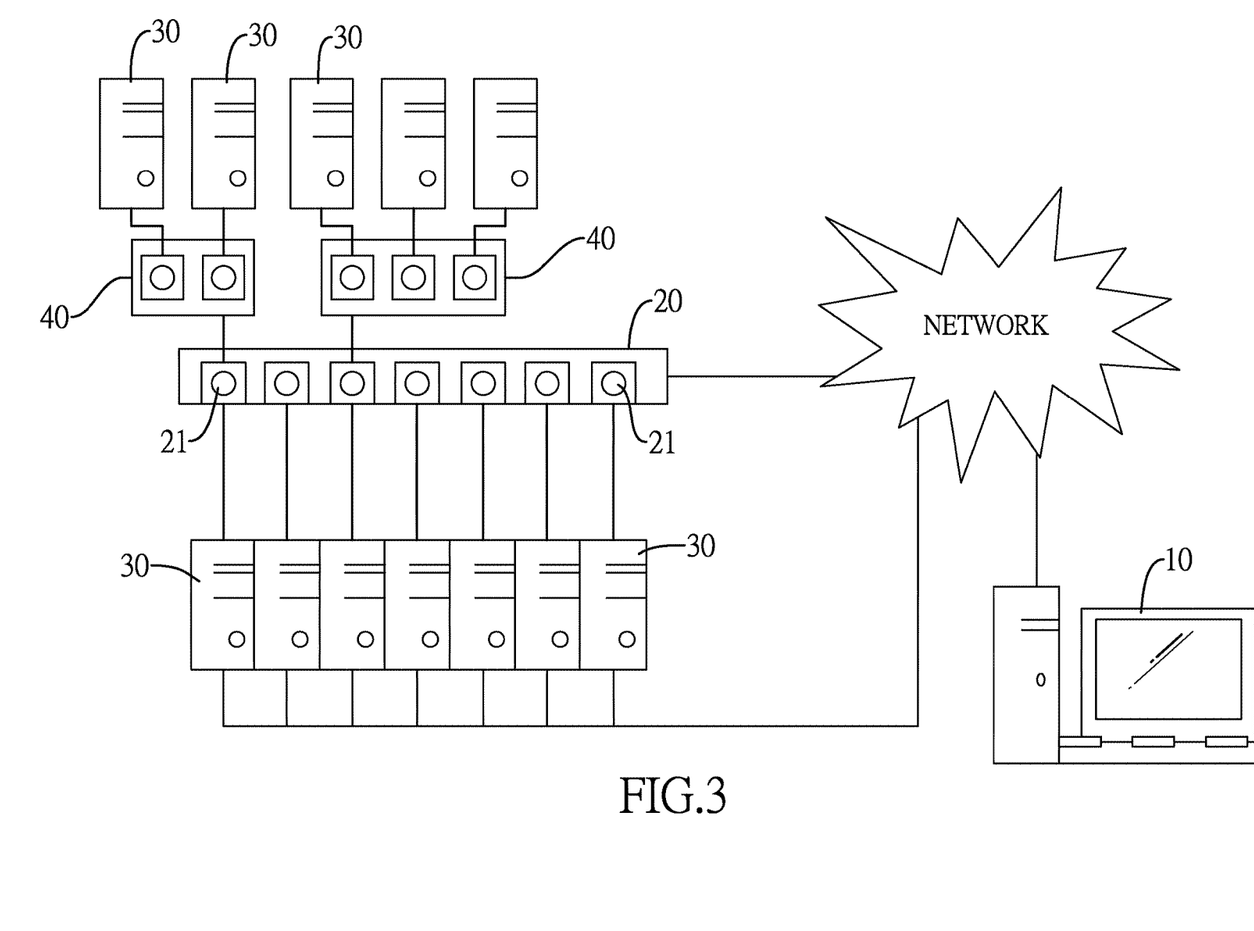
FIG. 3 is a schematic view of another power system for implement the shutdown control method in accordance with the present invention.

With reference to FIG. 3, in another embodiment of the power system, a power strip 40 is connected to the outlet 21 of the PDU 20 for connecting to multiple electric apparatus 30. Therefore, the multiple electric apparatus 30 obtain the AC power from the same outlet 21 of the PDU 20 through the power strip 40.

Figure 4A:
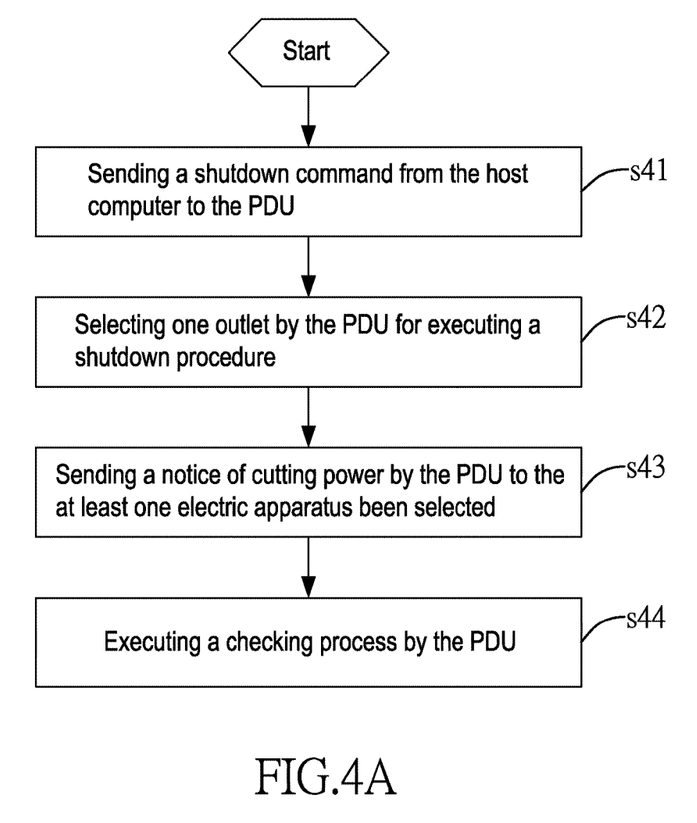
FIG. 4A is a flow chart of a first embodiment of the shutdown control method in accordance with the present invention.
Figure 4B:
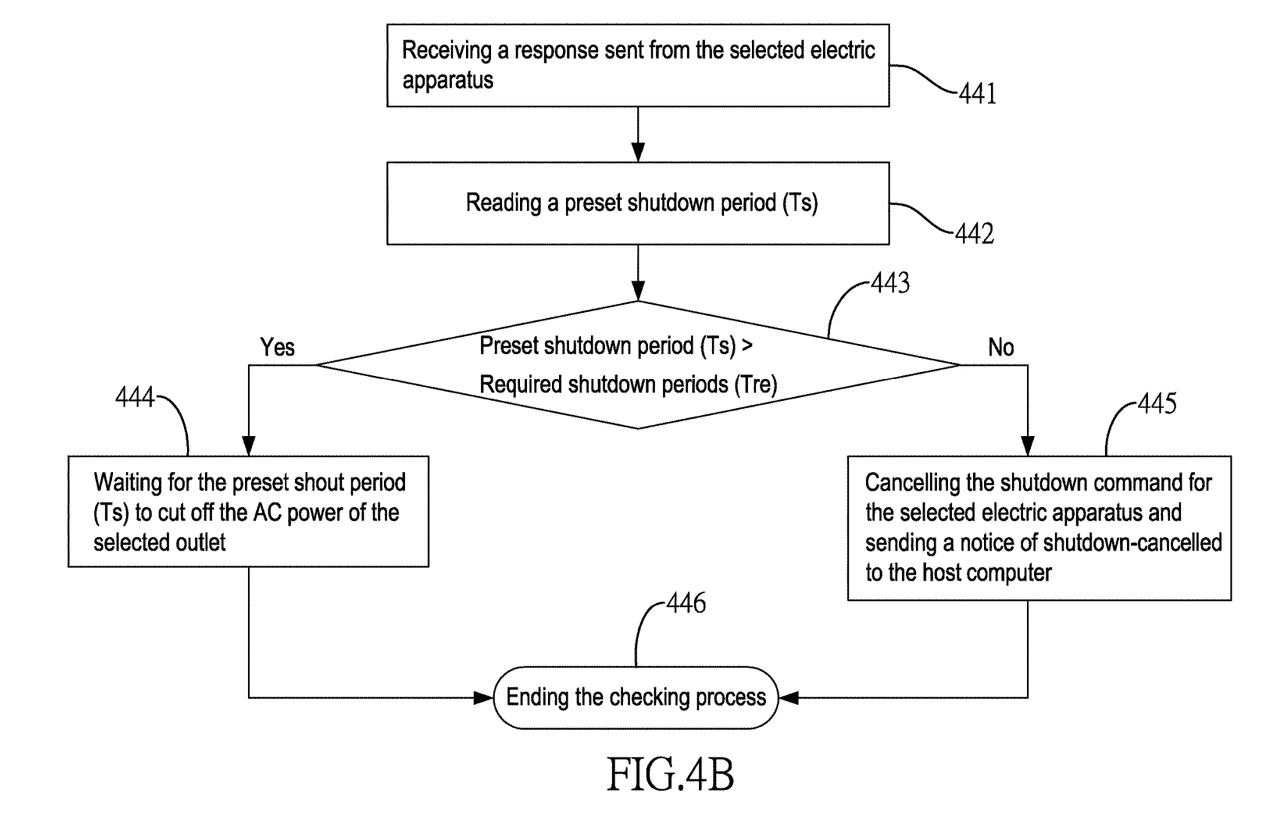
FIG. 4B is a flow chart of a checking process in FIG. 4A in accordance with the present invention.

With further reference to FIG. 4a, a first embodiment of the shutdown controlling method applied to the foregoing power systems of FIG. 1 comprises steps of:

s41: sending a shutdown command from the host computer 10 to the PDU 20 through the network.

s42: selecting one outlet 21 by the PDU 20 for executing a shutdown procedure, wherein the PDU 20 may simultaneously select all outlets 21 or sequentially select the outlets 21 according to a preset sequence; the shutdown procedure has following steps s43-s45:

s43: sending a notice of cutting power from the PDU 20 to an electric apparatus 30 (hereinafter the selected electric apparatus 30) connected to the selected outlet 21, wherein the notice of cutting power may be directly transmitted to the selected electric apparatus 30 been selected through the network or indirectly transmitted through the host computer 10; wherein in a preferred embodiment, the notice of cutting power is in a format meeting the simple network management protocol (SNMP).

s44: executing a checking process by the PDU 20 to determine whether the selected electric apparatus 30 is qualified to be cut off, wherein the checking process is shown in FIG. 4B and has steps of:

441: receiving a response sent from the selected electric apparatus 30, wherein the response includes a required shutdown period (Tre) of the selected electric apparatus 30.

442: reading a preset shutdown period (Ts) corresponding to the selected outlet 21 by the PDU 20;

443: determining whether the preset shutdown period (Ts) been read is larger than the required shutdown periods (Tre) of the selected electric apparatus 30;

444: waiting for the preset shutdown period (Ts) to cut off the AC power of the selected outlet when the preset shutdown period (Ts) been read is larger than the required shutdown periods (Tre);

445: cancelling the shutdown command and sending a notice of shutdown-cancelled to the host computer 10 when the preset shutdown period (Ts) been read is not larger than the required shutdown periods (Tre); and     446: ending the checking process for the selected electric apparatus 30.

When the PDU 20 sequentially selects the outlet 21, the shutdown procedure further includes a step:

returning to the step s42 for selecting a next outlet 21 not yet been selected and executing the shutdown procedure for the next outlet 21 until all the outlets 21 of the PDU 20 have been processed by the shutdown procedure.

As describe in the step s42, the PDU 20 may simultaneously select all the electric apparatuses 30 or sequentially select the electric apparatuses 30. When the PDU 20 simultaneously selects all the electric apparatuses 30 for executing the shutdown procedure and outputs the notice to the electric apparatuses 30, all the electric apparatuses 30 will be checked at the same time. In another aspect, when the PDU 20 sequentially selects the electric apparatuses 30 for executing the shutdown procedure, the electric apparatuses 30 are separately checked in sequence.

Furthermore, when the PDU 20 cancels the shutdown command for an electric apparatus 30, the method may further comprise following steps to re-shutdown the same electric apparatus 30:

updating the preset shutdown period (Ts) of the outlet 21 connected by the electric apparatus having the required shutdown period (Tre) larger than the preset shutdown period (Ts) to a new shutdown period (Ts_new), wherein the new shutdown period (Ts_new) may be input by the manager through the user interface 27 of the PDU 20 or the host computer 10; and executing the shutdown procedure again for the electric apparatus 30 that is connected to the outlet 21 having the new shutdown period (Ts_new).

In conclusion, according to the first embodiment described above, the PDU 20 sends the notice of cutting power to the electric apparatus 30 when the host computer 10 outputs the shutdown command After the electric apparatus 30 receives the notice of cutting power, the electric apparatus 30 outputs the response to the PDU 20. Because the response contains the required shutdown period (Tre) of the electric apparatus 30, the PDU 20 determines whether the preset shutdown period (Ts) is larger than the required shutdown period (Tre). If the preset shutdown period (Ts) is larger than the required shutdown period (Tre), the PDU 20 will cut the AC power off through the relay 22 connected to the selected outlet 21 after waiting the preset shutdown period (Ts). Therefore, the electric apparatus 30 connected to the selected outlet 21 has enough time to shut down completely and safely. On the contrary, if the preset shutdown period (Ts) is not larger than the required shutdown period (Tre), the PDU 20 cancels the shutdown command for the electric apparatus 30 and notifies the host computer 10. Therefore, a manager may further increase the preset shutdown period (Ts) of the selected outlet 21 to ensure that each electric apparatus has enough time to be completely shut down in next round of shutdown.

Figure 5A:
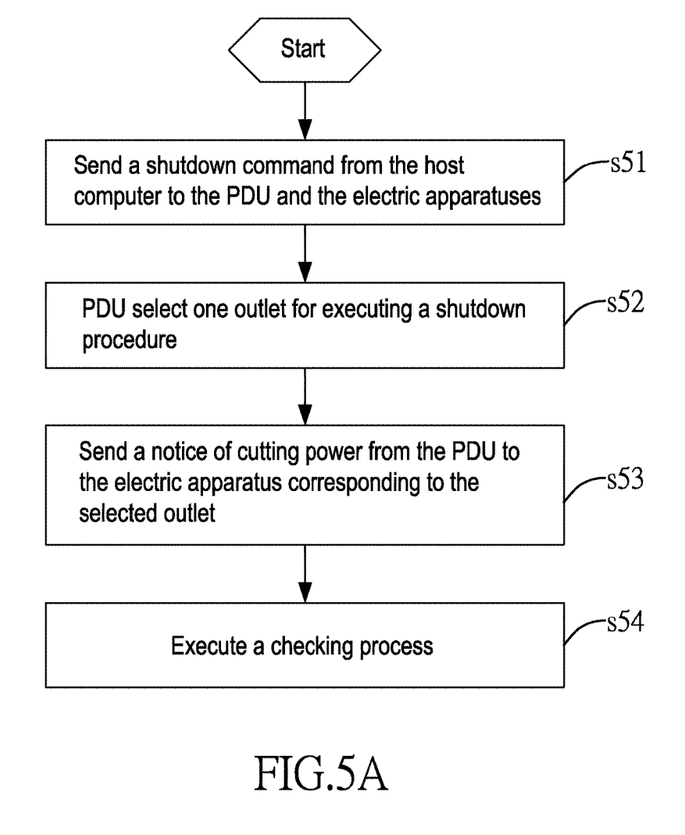
FIG. 5A is a flow chart of a second embodiment of the shutdown control method in accordance with the present invention.
Figure 5B:
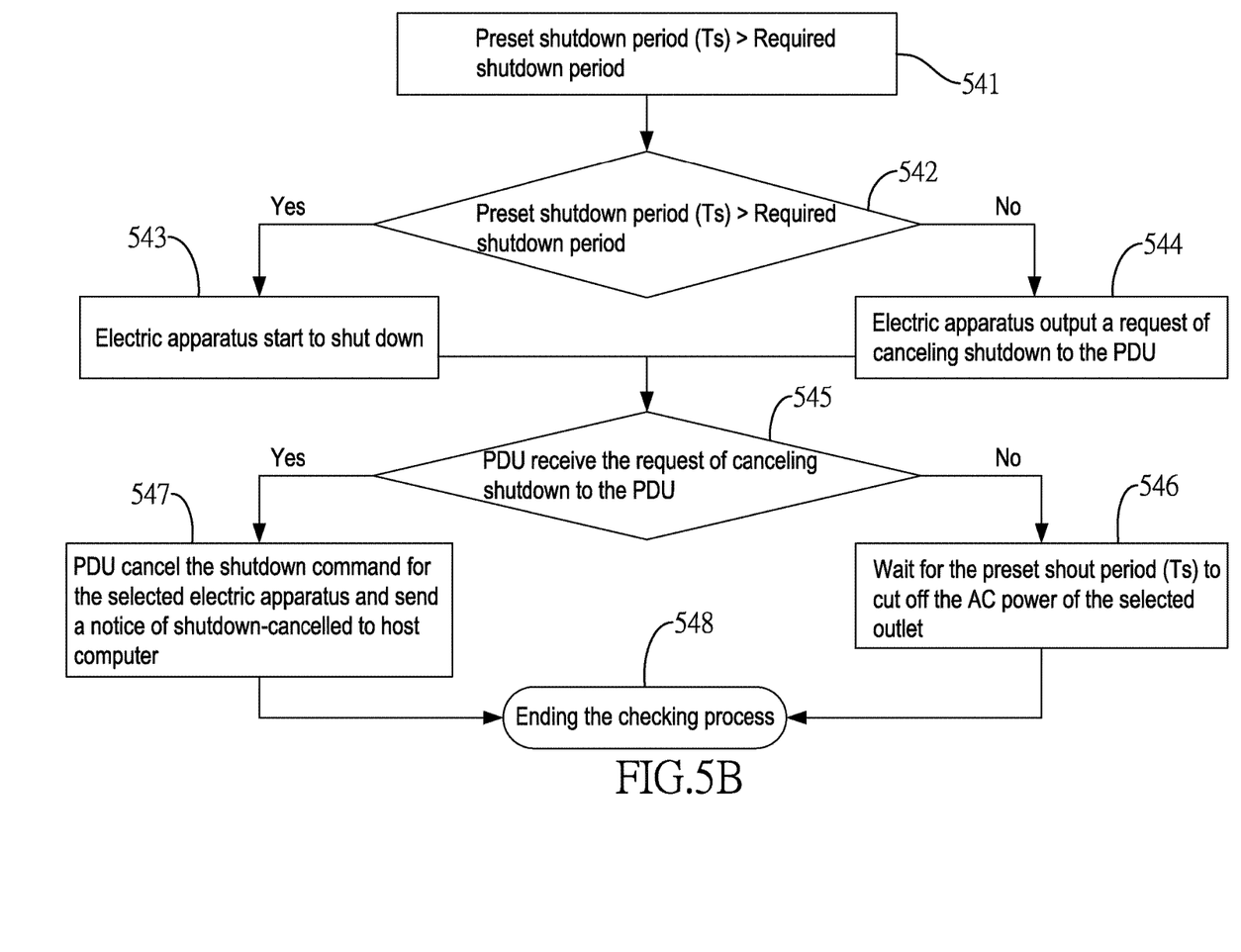
FIG. 5B is a flow chart of a checking process in FIG. 5A in accordance with the present invention.

With reference to FIG. 5A, a second embodiment of the shutdown controlling method applied to the power systems of FIG. 1 comprises steps of:

s51: sending a shutdown command from the host computer 10 to the PDU 20 and the electric apparatuses 30 connected to the PDU 20 through the network.

s52: the PDU 20 selecting one outlet 21 for executing a shutdown procedure, wherein the PDU 20 may simultaneously select all the outlets 21 or sequentially select the outlets 21 according to a preset sequence; the shutdown procedure has following steps.

s53: sending a notice of cutting power from the PDU 20 to the electric apparatus 30 (hereinafter the selected electric apparatus) corresponding to the selected outlet 21, wherein the notice of cutting power may be directly transmitted to the selected electric apparatus 30 through the network or indirectly transmitted through the host computer 10; wherein in a preferred embodiment, the notice of cutting power meets a standard of simple network management protocol (SNMP).

s54: when the selected electric apparatus 30 receives the notice of cutting power from the PDU 20 or receives the shutdown command from the host computer 10, executing a checking process to determine whether the selected electric apparatus 30 is qualified to be cut off, wherein the checking process is shown in FIG. 5B and includes following steps 541 to 544:

541: reading a preset shutdown period (Ts) of the selected outlet 21 stored in the PDU 20 by the selected electric apparatus;

542: determining whether the preset shutdown period (Ts) been read is larger than a required shutdown period (Tre) of the selected electric apparatus 30 by the electric apparatus 30 itself;

543: the selected apparatus 30 starting to shut down when the preset shutdown period (Ts) been read is larger than the required shutdown periods (Tre) of the selected electric apparatus 30;

544: the selected electric apparatus 30 outputting a request of canceling shutdown to the PDU 20 when the preset shutdown period (Ts) been read is not larger than the required shutdown periods (Tre) of the selected electric apparatus 30;

545: the PDU 20 waiting for a preset time to determine whether the selected electric apparatus 30 sends the request of canceling shutdown;

546: waiting for the preset shutdown period (Ts) to cut off the AC power of the outlet 21 corresponding to the electric apparatus 30 when the PDU 20 does not receive the request of canceling shutdown;

547: the PDU 20 cancelling the shutdown command for the selected electric apparatus 30 and sending a notice of shutdown-cancelled to the host computer 10 when the request of canceling shutdown is received.

In the step 547, whenever the PDU 20 cancels the shutdown command, the shutdown procedures for remaining electric apparatuses 30 not yet been cut off will be cancelled. For example, when the PDU 20 receives the shutdown command and simultaneously selects the outlets 21, such as $1^{st}$ outlet to the $6^{th}$ outlet, the electric apparatuses 30 connected to the all six outlets execute the checking processes to determine themselves are qualified to be cut off, and some electric apparatuses 30 may output the requests of cancelling shutdown. If one of the electric apparatuses 30, such as the $3^{rd}$ electric apparatus 30, outputs the request of cancelling shutdown to the PDU 20, the PDU 20 accordingly cancels the shutdown command. At the time the PDU cancels the shutdown command, if the $1^{st}$ and $4^{th}$ electric apparatus have been cut off, shutdown procedures for other remaining electric apparatuses 30, i.e. the $2^{nd}$, $5^{th}$ and $6^{th}$ electric apparatuses will be cancelled regardless of their determining results.

Furthermore, when the PDU 20 cancels the shutdown command for an electric apparatus 30, the method of the second embodiment may further comprise following steps to re-shutdown the same electric apparatus 30:

updating the preset shutdown period (Ts) of the outlet 21 connected by the electric apparatus having the required shutdown period (Tre) larger than the preset shutdown period (Ts) to a new shutdown period (Ts_new), wherein the new shutdown period (Ts_new) may be input by the manager through the user interface 27 of the PDU 20 or the host computer 10; and executing the shutdown procedure again for the electric apparatus 30 that is connected to the outlet 21 having the new shutdown period (Ts_new).

In short, according to the second embodiment described above, the electric apparatus 30 to be cut off executes the checking process when the electric apparatus 30 is informed by the host computer 10 or the PDU 20. Because the preset shutdown period (Ts) is stored in the PDU 20, the electric apparatus 30 will retrieve the corresponding preset shutdown period (Ts) and then determine whether the corresponding preset shutdown period (Ts) is larger than the required shutdown period (Tre). When the preset shutdown period (Ts) is larger than the required shutdown period (Tre), the electric apparatus 30 starts to shut down. However, when the preset shutdown period (Ts) is not larger than the required shutdown period (Tre), the electric apparatus 30 outputs the request of cancelling shutdown instead to the PDU 20. When the PDU 20 does not receive any request of cancelling shutdown from the electric apparatus 30, the PDU 20 will cut the AC power off through the relay 22 after waiting the preset shutdown period (Ts). Therefore, the electric apparatus 30 connected to the selected outlet 21 has enough time to shut down completely and safely. On the contrary, if the PDU 20 receives the request of cancelling shutdown, the PDU 20 cancels the shutdown command for the electric apparatus 30 and notifies the host computer 10. Therefore, a manager may further increase the preset shutdown period (Ts) of the selected outlet 21 to ensure that the electric apparatus 30 has enough time to be completely shut down when the host computer re-outputs the shutdown command.

Figure 6A:
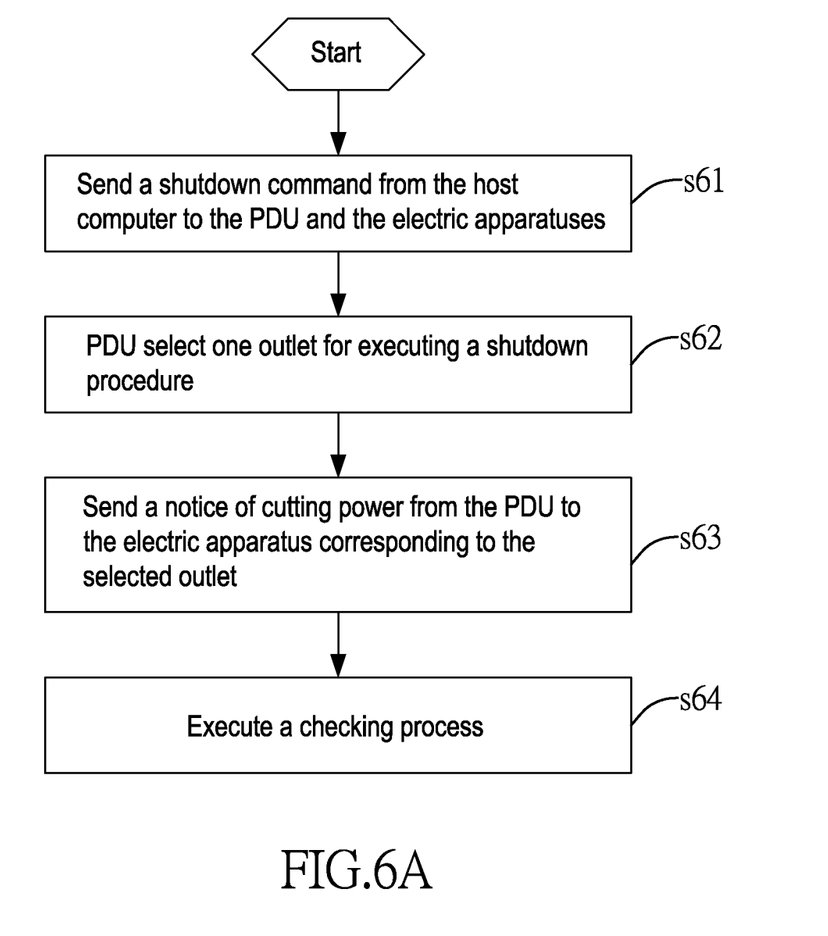
FIG. 6A is a flow chart of a third embodiment of the shutdown control method in accordance with the present invention.
Figure 6B:
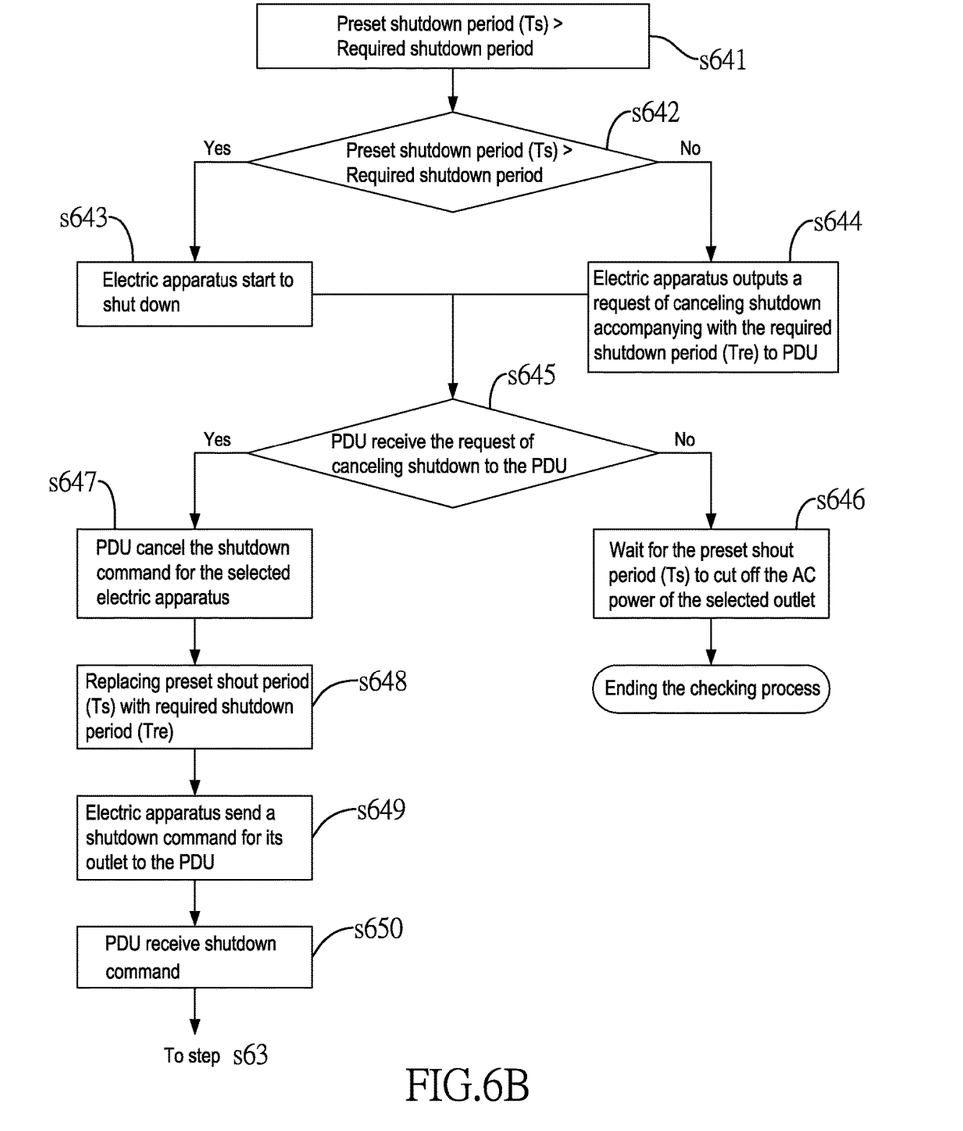
FIG. 6B is a flow chart of a checking process in FIG. 6A in accordance with the present invention.

With reference to FIG. 6, a third embodiment of the shutdown controlling method applied to the power systems of FIG. 3, which is similar to the second embodiment, comprises steps of:

s61: sending a shutdown command from the host computer 10 to the PDU 20 and the electric apparatus 30 connected to the PDU 20 through the network.

s62: the PDU 20 selecting one electric apparatus 30 for executing a shutdown procedure, wherein the PDU 20 may simultaneously select all the electric apparatuses 30 or sequentially select the electric apparatuses 30 according to a preset sequence; the shutdown procedure has following steps:

s63: sending a notice of cutting power from the PDU 20 to the electric apparatus 30 (hereinafter the selected electric apparatus) corresponding to the selected outlet 21, wherein the notice of cutting power may be directly transmitted to the electric apparatus 30 been selected through the network or indirectly transmitted through the host computer 10; wherein in a preferred embodiment, the notice of cutting power meets a standard of simple network management protocol (SNMP).

s64: when the selected electric apparatus 30 receives the notice of cutting power from the PDU 20 or receives the shutdown command from the host computer 10, executing a checking process to determine whether the electric apparatus 30 is qualified to be cut off, wherein the checking process is shown in FIG. 6B and includes following:

S641: reading a preset shutdown period (Ts) stored in the PDU 20 of the selected outlet 21;

s642: determining whether the preset shutdown period (Ts) been read is larger than a required shutdown periods (Tre) stored in the selected electric apparatus 30 by the electric apparatus 30;

s643: starting to shut down when the preset shutdown period (Ts) been read is larger than the required shutdown periods (Tre) of the electric apparatus 30 itself;

s644: outputting a request of canceling shutdown accompanying with the required shutdown period (Tre) of the electric apparatus 30 to the PDU 20 when the preset shutdown period (Ts) been read is not larger than the required shutdown periods (Tre) of the selected electric apparatus 30;

s645: the PDU 20 waiting for a preset time to determine whether the electric apparatus 30 sends the request of canceling shutdown; wherein because a single outlet 21 of the PDU 20 may be connected with multiple electric apparatuses 30 via the power strip 40 as shown in FIG. 3, the PDU 20 will wait the preset time to determine whether any of the electric apparatuses 30 connected to the same selected outlet 21 issues the request of canceling shutdown; when any of the electric apparatuses 30 connected to the same selected outlet 21 issues the request of canceling shutdown, going to the following step s67; and only when none of the electric apparatuses 30 connected to the same selected outlet 21 issues the request of canceling shutdown, going to the following step s66;

s646: waiting for the preset shutdown period (Ts) to cut off the AC power of the selected outlet 21 when the PDU 20 does not receive the request of canceling shutdown.

s647: the PDU 20 cancelling the shutdown command when the request of canceling shutdown is received.

s648: replacing the preset shutdown period (Ts) stored in the PDU 20 with the required shutdown period (Tre) sent from the selected electric apparatus 30.

s649: the selected electric apparatus 30 sending a shutdown command for its outlet 21 to the PDU 20.

S650: the PDU 20 receiving the shutdown command for cut off the outlet 21 and returning to the step s63.

According to the third embodiment described above, the electric apparatus 30 to be cut off executes the checking process when the electric apparatus 30 is informed by the host computer 10 or the PDU 20. Because the preset shutdown period (Ts) is stored in the PDU 20, the electric apparatus 30 will retrieve the corresponding preset shutdown period (Ts) and then determine whether the corresponding preset shutdown period (Ts) is larger than the required shutdown period (Tre). When the preset shutdown period (Ts) is larger than the required shutdown period (Tre), the electric apparatus 30 starts to shut down. However, when the preset shutdown period (Ts) is not larger than the required shutdown period (Tre), the electric apparatus 30 outputs the request of cancelling shutdown and its required shutdown period (Tre) to the PDU 20.

When the PDU 20 does not receive any request of cancelling shutdown from the electric apparatus 30, the PDU 20 will cut the AC power off after waiting the preset shutdown period (Ts). Therefore, the electric apparatus 30 connected to the selected outlet 21 has enough time to shut down completely and safely. On the contrary, if the PDU 20 receives the request of cancelling shutdown and the required shutdown period (Tre), the PDU 20 cancels the shutdown command for the electric apparatus 30 and resets the original present shutdown period (Ts) of the selected outlet 21 with the required shutdown period (Tre). Therefore, the same selected outlet 21 has enough time, i.e. required shutdown period (Tre), to ensure that the electric apparatus 30 be safely shut down when the host computer re-outputs the shutdown command.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A shutdown controlling method for a power system, the power system comprising a host computer, a power distribution unit (PDU) connected to the host computer through a computer network, having multiple outlets, and storing multiple preset shutdown periods (Ts) for the outlets respectively, and multiple electric apparatuses respectively connected to the outlets of the PDU to receive an AC power, and linked to the host computer and the PDU through the computer network, the shutdown controlling method comprising steps of:

sending a shutdown command from the host computer to the PDU through the computer network;

simultaneously selecting the multiple outlets by the PDU to execute a shutdown procedure for each of the multiple outlets, the shutdown procedure has steps of:

(a) simultaneously sending a notice of cutting power from the PDU to each of the electric apparatuses connected to a corresponding outlet through the computer network;

(b) simultaneously executing a checking process by the PDU to determine whether each of the electric apparatuses is qualified to be cut off, wherein the checking process comprises steps of:

(b1) receiving a response sent from each of the electric apparatuses through the computer network, wherein the response includes a required shutdown period (Tre) of the electric apparatus;

(b2) reading one of the multiple preset shutdown periods (Ts) of the corresponding outlet stored in the PDU;

(b3) determining whether the preset shutdown period (Ts) is larger than the required shutdown period (Tre) of each of the electric apparatuses;

(b4) waiting for the preset shutdown period (Ts) to cut off the AC power of the corresponding outlet when the preset shutdown period (Ts) been read is larger than the required shutdown periods (Tre); and (b5) cancelling the shutdown command and sending a notice of shutdown-cancelled to the host computer through the computer network when the preset shutdown period (Ts) been read is not larger than the required shutdown periods (Tre); and (b6) ending the checking processes for the multiple electric apparatuses;

by executing the steps (a) to (b4), the PDU cuts off the AC power of the corresponding outlet; by executing the steps (a) to (b3), (b5) and (b6), the PDU sends a notice of shutdown-cancelled to the host computer, the shutdown command is cancelled, and the shutdown procedures for the remaining electric apparatuses not yet been cut off are cancelled, after ending the checking processes and cancelling the shutdown command, the method further comprises steps of:

the PDU updating the preset shutdown period (Ts) of the corresponding outlet connected by the electric apparatus having the required shutdown period (Tre) larger than the preset shutdown period (Ts) to a new shutdown period; and executing the shutdown procedure again for the electric apparatus that is connected to each outlet having the new shutdown period, and for each of the remaining apparatuses for which the shutdown procedure was cancelled.

2. The method as claimed in claim 1, wherein in the step of updating the preset shutdown period, the new shutdown period is input through a user interface of the PDU or through the host computer.

3. A shutdown controlling method for a power system, the power system comprising a host computer, a power distribution unit (PDU) connected to the host computer through a computer network, having multiple outlets, and storing multiple preset shutdown periods (Ts) for the outlets respectively, and multiple electric apparatuses respectively connected to the outlets of the PDU to receive an AC power, and linked to the host computer and the PDU through the computer network, the shutdown controlling method comprising steps of:

(a) sending a shutdown command from the host computer to the PDU and the electric apparatuses connected to the PDU through the computer network;

(b) simultaneously selecting the multiple outlets by the PDU to execute a shutdown procedure for each of the multiple outlets, the shutdown procedure has steps of:

(c) simultaneously sending a notice of cutting power from the PDU to each of the electric apparatuses connected to a corresponding outlet through the computer network;

(d) simultaneously executing a checking process by each of the electric apparatuses and the PDU when each of the electric apparatuses receives the notice of cutting power from the PDU or receives the shutdown command from the host computer, the checking process has steps of:

(d1) reading one of the multiple preset shutdown periods (Ts) of the corresponding outlet stored in and sent from the PDU by each of the electric apparatuses through the computer network;

(d2) each of the electric apparatuses determining whether the preset shutdown period (Ts) is larger than its required shutdown period (Tre);

(d3) each of the electric apparatuses starting to shut down when the preset shutdown period (Ts) is larger than the required shutdown periods (Tre);

(d4) each of the electric apparatuses outputting a request of canceling shutdown to the PDU through the computer network when the preset shutdown period (Ts) is not larger than the required shutdown periods (Tre);

(d5) the PDU waiting for a preset time to determine whether any of the electric apparatuses sends the request of canceling shutdown;

(d6) the PDU waiting for the preset shutdown period to cut off the AC power of the corresponding outlet when the PDU does not receive the request of canceling shutdown;

(d7) the PDU cancelling the shutdown command and sending a notice of shutdown-cancelled to the host computer through the computer network when the request of canceling shutdown is received from any of the electric apparatuses;

by executing the steps (a) to (d3) and (d6), the PDU cuts off the AC power of the corresponding outlet; by executing the steps (a) to (d2), (d4), (d5) and (d7), the PDU sends a notice of shutdown-cancelled to the host computer, the shutdown command is cancelled, and the shutdown procedures for the remaining electric apparatuses not yet been cut off are cancelled, after the PDU cancelling the shutdown command and sending a notice of shutdown-cancelled to the host computer, the method further comprises steps of:

updating the preset shutdown period (Ts) of the corresponding outlet connected by the electric apparatus having the required shutdown period (Tre) larger than the preset shutdown period (Ts) to a new shutdown period; and executing the shutdown procedure again for each of the electric apparatuses that is connected to the outlet having the new shutdown period, and for each of the remaining apparatuses for which the shutdown procedure was cancelled.

4. The method as claimed in claim 3, wherein in the step of updating the preset shutdown period, the new shutdown period is input through a user interface of the PDU or through the host computer.

5. A shutdown controlling method for a power system, the power system comprising a host computer, a power distribution unit (PDU) connected to the host computer through a computer network, having multiple outlets and storing multiple preset shutdown periods (Ts) for the outlets respectively, and multiple electric apparatuses connected to the outlets of the PDU to receive an AC power and linked to the host computer and the PDU through the computer network, wherein each outlet is connected to multiple electric apparatuses via a power strip, the shutdown controlling method comprising steps of:

(a) sending a shutdown command from the host computer to the PDU and each of the electric apparatuses connected to the PDU through the computer network;

(b) simultaneously selecting the multiple outlets by the PDU to execute a shutdown procedure for each of the multiple outlets, the shutdown procedure has steps of:

(c) simultaneously sending a notice of cutting power from the PDU to each of the electric apparatuses connected to a corresponding outlet;

(d) simultaneously executing a checking process by each of the electric apparatuses and the PDU when each of the electric apparatuses receives the notice of cutting power from the PDU or receives the shutdown command from the host computer, the checking process has steps of:

(d1) reading one of the multiple preset shutdown periods (Ts) of the corresponding outlet stored in and sent from the PDU by each of the electric apparatuses through the computer network;

(d2) each of the electric apparatuses determining whether the preset shutdown period (Ts) is larger than its required shutdown period (Tre);

(d3) each of the apparatuses starting to shut down when the preset shutdown period (Ts) is larger than the required shutdown periods (Tre);

(d4) each of the electric apparatuses outputting a request of canceling shutdown accompanying with the required shutdown period (Tre) of each of the electric apparatuses to the PDU through the computer network when the preset shutdown period (Ts) is not larger than the required shutdown periods (Tre);

(d5) the PDU waiting for a preset time to determine whether any of the electric apparatuses sends the request of canceling shutdown;

(d6) the PDU waiting for the preset shutdown period to cut off the AC power of the corresponding outlet when the PDU does not receive the request of canceling shutdown;

(d7) the PDU cancelling the shutdown command when the request of canceling shutdown is received from any of the electric apparatuses;

(d8) the PDU replacing the preset shutdown period (Ts) of a corresponding outlet with the required shutdown period (Tre) sent from any of the electric apparatuses that sent the request of cancelling shutdown through the computer network;

(d9) any of the electric apparatuses that sent the request of cancelling shutdown sending a shutdown command for the corresponding outlet connected to the electric apparatus to the PDU;

(d10) the PDU receiving the shutdown command for cutting off the corresponding outlet, thereby ending the shutdown process for the electric apparatus that sent the request of cancelling shutdown and for any remaining electric apparatuses, and returning to the step (c);

by executing the steps (a) to (d3) and (d6), the PDU cuts off the AC power of the corresponding outlet; by executing the steps (a) to (d2), (d4), (d5) and (d7) to (d10), the shutdown command is cancelled, the shutdown procedures for the remaining electric apparatuses not yet been cut off are cancelled, the preset shutdown period (Ts) of the corresponding outlet is replaced, and the electric apparatus resends a shutdown command.

\* \* \* \* \*